W. A. PARMENTER & A. B. ALDEN.
SKIVING MACHINE.
APPLICATION FILED MAR. 27, 1911.
Reissued Jan. 9, 1912. 13,355.
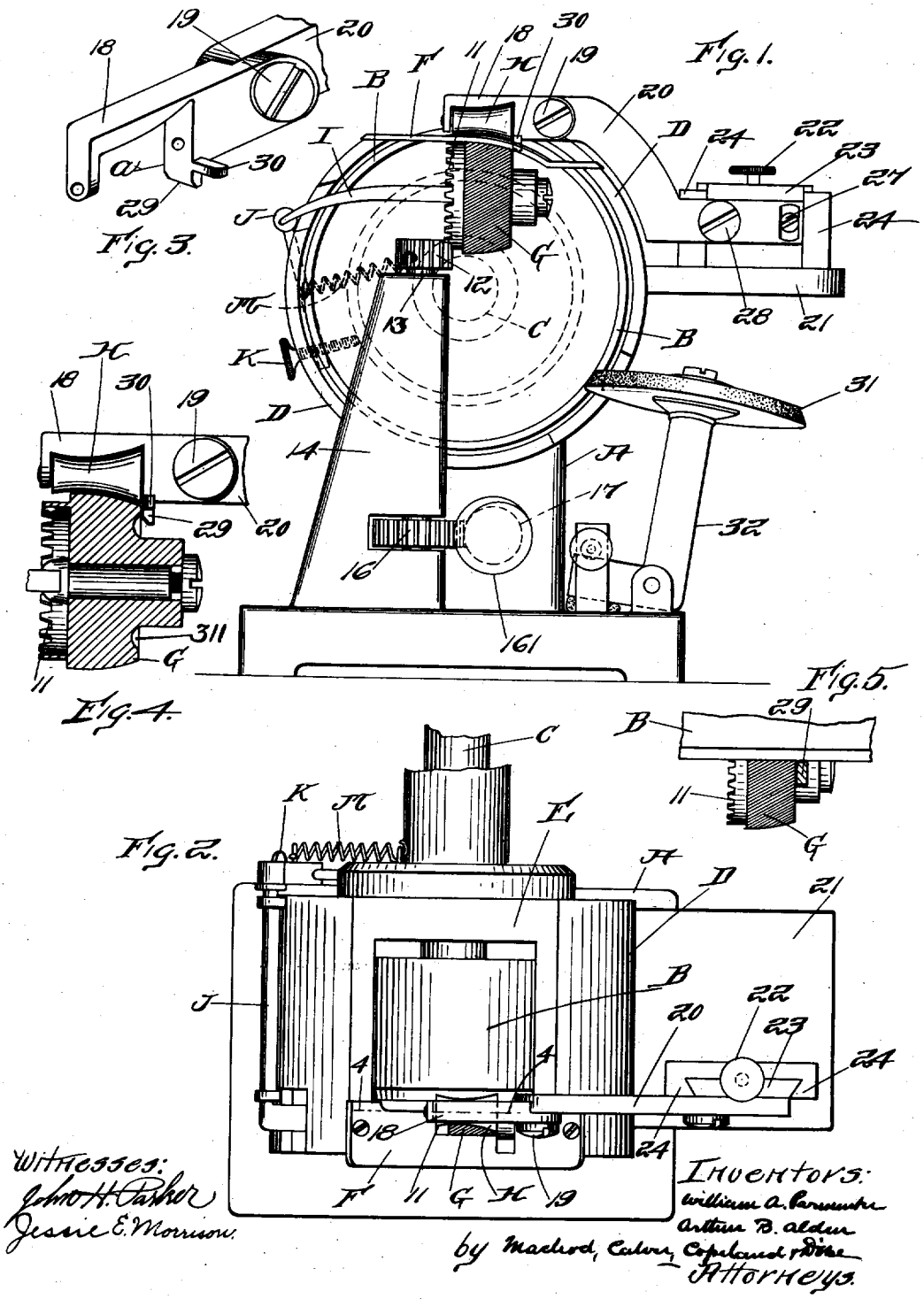
Witnesses:
John H. Parker
Jessie E. Morrison.
Inventors:
William A. Parmenter
Arthur B. Alden
by Macleod, Calver, Copeland & Dike
Attorneys.
COLUMBIA PLANOGRAPH CO., WASHINGTON, D. C.

UNITED STATES PATENT OFFICE.

WILLIAM A. PARMENTER AND ARTHUR B. ALDEN, OF BROCKTON, MASSACHUSETTS, ASSIGNORS, BY DIRECT AND MESNE ASSIGNMENTS, TO C. S. PIERCE SKIVING MACHINE COMPANY, OF BROCKTON, MASSACHUSETTS, A CORPORATION.

SKIVING-MACHINE.

13,355. Specification of Reissued Letters Patent. Reissued Jan. 9, 1912.

Original No. 944,103, dated December 21, 1909, Serial No. 466,632. Application for reissue filed March 27, 1911. Serial No. 617,309.

*To all whom it may concern:*

Be it known that we, WILLIAM A. PARMENTER and ARTHUR B. ALDEN, citizens of the United States, residing at Brockton, county of Plymouth, and State of Massachusetts, have invented a certain new and useful Improvement in Skiving-Machines, of which the following is a specification, reference being had therein to the accompanying drawings.

Our invention has for its object an improvement in machines employed for thinning the edges of pieces of leather, such for instance as are employed in bookbinding and in the manufacture of boots and shoes.

The invention relates particularly to machines of the kind in which a cylindrical knife is employed, but the machine embodying our invention is so constructed that it will do all the kinds of work which have heretofore been done on machines employing a rotating disk knife, known as Amazeen machines, as well as the work heretofore done on machines of the type employing a cylindrical knife, and in addition thereto certain work which it has not been possible to do on either of these kinds of machines, such for instance as skiving the throat of the vamp of the boot or shoe. Heretofore, so far as is known to us, it has been impossible to skive the throat of the vamp owing to the fact that the guide which assists in presenting the work to the knife interferes with the leather when the leather is swung around to present the curved portion of the work to the knife, and this results in cutting or notching the edge of the leather. Also no abutment furnishing a pivot at the cutting point (that is at the point where the plane of the side of the internally disposed feed wheel intersects the line of the top edge of the knife) has been provided, and the work has been supported at a distance from the cutting edge if at all. It is believed that it results from this that the portion of work between the cutting edge and the point of support springs or gives a little so that a wavy uneven scarf is produced.

The machine embodying our present invention will do the various kinds of work heretofore done by machines of the two kinds referred to, and in addition thereto, will also skive the throat of the vamps without injury to the stock.

The scarf cut by the machine embodying our invention even when the stock is thin and yielding is smooth and even, and may be cut narrow or wide as may be desired.

Our invention is also particularly adapted to do the ordinary work of a skiving machine more rapidly than machines heretofore employed so far as is known to us, particularly by reason of the fact that the work may be turned in any direction by the operator without striking the support for the feed guide, and also because the work is fed through the machine from front to back instead of from side to side, as has heretofore been the case. The arrangement makes it possible for the operator to guide the work with greater accuracy while at the same time working with greater speed. So far as is known to us this has not been heretofore possible in the machines of the type employing a cylindrical knife.

The invention will be fully understood from the following description taken in connection with the accompanying drawings and the novel features will be pointed out and clearly defined in the claims at the close of the specification.

In the drawings, Figure 1 is a front elevation of a machine embodying our invention. Fig. 2 is a top plan view of the working parts shown in Fig. 1. Fig. 3 is a view in perspective of the bracket with the said guide roller removed. Fig. 4 is a section of the feed wheel taken on line 4—4 Fig. 2. Fig. 5 is a plan view of the adjacent portions of the knife, and feed wheel, the portion of the depending abutment 29 which occupies the angle between the edge of the knife and the side face of the feed-wheel being in section.

Referring to the drawings, at A is indicated the frame of the machine which is of any convenient shape and form. In the said frame is located the cylindrical knife B mounted on the shaft C and driven by means not shown. The knife B is surrounded by a housing or casing D, which is preferably formed integral with the frame of the machine, and which serves to protect the operator from the edge of the knife. The top of said housing is flattened as shown at E which together with the shelf F forms a support for the work as it is guided to the rotating knife. The work is presented to the knife by means of a knurled feed wheel G and a rotating feed guide H which coöperate with each other, the former being located above and the latter below the point at which the cutting operation is performed.

The feed wheel G is interiorly disposed being supported partially within the cylindrical knife B upon one arm I of a rockshaft J which is pivoted on the frame of the machine. The other arm of the said rockshaft J extends downwardly and carries at its lower end a thumbscrew K the end of which strikes against the frame or some other fixed part of the machine being held in contact therewith by means of the spring M. It will be seen that a movement of the thumb screw K tends to move the feed wheel G up and down as the case may be. The feed wheel G is positively driven by means of a crown gear 11 formed on its left hand end surface as seen in Fig. 1, and said crown gear meshes with a gear 12 carried on a shaft 13 in bracket 14 of the frame A of the machine. The lower end of said shaft 13 is provided with a worm gear 16 which meshes with the worm wheel 161 on a shaft 17 driven from a suitable source of power not shown. The feed wheel G and the driving means therefor are fixed so far as movement from the front to the back of the machine is concerned, although the said feed wheel G is movable slightly vertically on the rockshaft J. Adjustment of the position of the cylindrical knife B necessitated by the wearing away of the said knife is obtained by adjusting the knife forward or back in any convenient manner.

The feed wheel G has a curved and preferably knurled surface of the shape shown plainly in elevation in Fig. 1, and the portion of the surface of the said feed wheel which lies at the right of a vertical line passing through the center of the cylindrical knife B conforms closely to the adjacent portion of the said cylindrical knife, and this portion of the feed wheel which lies to the right of said line is the effective portion of the feed wheel by means of which the work is presented to the knife. By this construction we find that a much better quality of work is secured than has heretofore been the case where the effective portions of the feed wheel lie half on one side and half on the other side of said line, or in other words, where the feed wheel was arranged symmetrically with respect to said line, since in the form symmetrically arranged there is a tendency to pucker the leather if the leather is swung about the cutting point which tends to injure or even destroy stock and produce unsatisfactory work. The machine constructed as herein described skives the edge of the work smoothly, even when the work is being swung around the cutting point.

The guide roll which coöperates with the work on the upper side thereof is of a form corresponding to the form of the feed wheel D. Said guide roll H is supported on an adjustable arm 18 pivoted at 19, to the adjustable bracket 20 which is itself supported adjustably on a projection 21 on the housing D about the cylindrical knife. Said feed wheel H is adjustable vertically by means of the thumb screw 22 which moves the sliding piece 23 vertically in ways 24 supported on the projection 21 on the housing of the machine. It is also preferably adjustable horizontally by means of the eccentric screw 27 of well known form and the set screw 28 and it also may be swung about the pivot 19. The bracket 20 and the parts by means of which the guide roll H is supported are all below the level of the table E with the exception of the upper end of the bracket arm 20 and the arm 18, and these parts are made as small as possible so that they will offer little or no obstruction to the swinging movement of the work. By this construction it is possible to swing the work around the cutting point without having it strike any of the adjacent parts. So far as is known to us this has not been possible in machines of this kind. We also provide the arm 18, see particularly Fig. 3, in which the guide roll H is supported, with a downward projection or abutment 29 which lies adjacent the edge of the roller G and as nearly in contact with it as practical. The edge of the feed wheel G which is adjacent the downward projection or abutment 29 is somewhat concave, as shown at 311, and is made in this form so that there will be no interference with the feed wheel by the abutment 29 when the arm 18 is adjusted at some angles. The abutment 29 fills the space in the angle between the side face of the feed wheel D and the upper edge of the cylindrical knife B being adjusted as closely to both as possible, and forms a pivot about which the work is swung when skiving a curve. The vertical edge or corner of the abutment 29 which is the line designated *a* in Fig. 3 forms the point of support for the work as it swings when a curve is being skived, and this is closely adjacent the cutting point, so that the work is supported substantially at the cutting point, and there is no chance for the portion of the work between the cutting point and the point of support to spring as is the case where the point of support is from 3/8ths to 5/8ths of an inch from the cutting point as has heretofore been customary. This feature assists materially in making it possible to skive curves on soft flexible or yielding material.

A forward projection 30 on the adjustable arm 18 is also provided substantially on a level with the shelf F. The projection or abutment 30 flares slightly away from the roll and both the projections 29 and 30 on the arm 18 lie very close to the adjacent edges of both the feed wheel D and guide roll H and effectively prevent the thin stock from running or being drawn over the edge of the feed wheel which would result in immediate ruin of the stock. This arrangement is exceedingly important as it prevents much loss of stock.

Any convenient grinder for the cylindrical knife may be provided. In the drawings we have shown a grinder of the well known type, consisting of a disk 31 of emery or other abrading material adjustably located in contact with the edge of the cylindrical knife by means of the bracket 32.

What we claim is:

1. In a skiving machine, the combination with a cylindrical knife, of a feed wheel internally disposed with relation thereto and having its effective surface at one side of a vertical line passed through the axis of the cylindrical knife, said side being that away from the main portion of the stock to be operated upon.

2. In a machine of the character described, the combination with a cylindrical knife and a feed wheel located internally with respect thereto, of a feed guide cooperating with said feed wheel, a support for said guide provided with a depending abutment adjacent the top side edge of the feed wheel, and a second abutment extending horizontally at the level of the edge of the work as it passes between the feed wheel and the feed guide.

3. In a machine of the character described, the combination with a cylindrical knife and a feed wheel located internally with respect thereto, of a feed guide cooperating with said feed wheel, a support for said guide provided with a depending abutment adjacent the top side edge of the feed wheel and a second abutment extending horizontally at the level of the edge of the work as it passes between the feed wheel and the feed guide, said second abutment flaring slightly away from said rolls.

4. In a machine of the character described, the combination with a cylindrical knife, of a feed wheel internally disposed with relation thereto, a guide roll coöperating with said feed wheel to feed the work, means for supporting said guide roll and an abutment on said supporting means adjacent the outside edges of both the feed wheel and the guide roll whereby stock is prevented from running over the edge of the feed wheel.

5. In a machine of the character described, the combination with a cylindrical knife, of the feed wheel internally disposed with relation thereto, a guide roll coöperating with said feed wheel to feed the work, and means for supporting the said guide roll and swinging it in the plane of the axes of said feed wheel and said guide roll, said supporting means being provided with an abutment adjacent the outside edge of the feed wheel whereby the stock is prevented from running over the edge of the feed wheel.

6. In a machine of the character described, the combination with a cylindrical knife of a feed wheel internally disposed with relation thereto and having a concaved end surface, a guide roll coöperating with said feed wheel to feed the work, means for supporting the said guide roll and swinging it in the plane of the axes of the said feed wheel and said guide roll, said supporting means being provided with an abutment coöperating with said concaved end surface of said feed wheel, whereby the stock is prevented from running off the edge of the feed wheel.

7. In a machine of the character described, the combination of a cylindrical knife, a feed wheel interiorly disposed with relation thereto and a feed guide having an abutment at the cutting point, said abutment having two faces one of which is substantially parallel to the plane of the edge of the knife and the other of which is substantially parallel to the edge of the feed wheel, said faces being closely adjacent to the planes of the edge of said knife and of the face of the feed wheel respectively.

8. In a machine of the character described, the combination with a cylindrical knife, a feed wheel interiorly disposed with relation thereto, and a feed guide having a depending abutment in the angle between the face of the feed wheel and the edge of the knife and closely adjacent both said face and said edge, the face of said abutment next the feed wheel being parallel with the face of the said feed wheel and projecting downwardly to overlap the periphery of the said face.

In testimony whereof we affix our signatures in presence of two witnesses:

WILLIAM A. PARMENTER.
ARTHUR B. ALDEN.

Witnesses:
GEORGE P. DIKE,
ALIC H. MORRISON.

Copies of this patent may be obtained for five cents each, by addressing the "Commissioner of Patents, Washington, D. C."